United States Patent [19]

Woo et al.

[11] Patent Number: 5,645,904

[45] Date of Patent: Jul. 8, 1997

[54] METHOD AND COMPOSITIONS THAT RENDER MATERIALS RF RESPONSIVE

[75] Inventors: Lecon Woo, Libertyville; Ying Lo, Mundelein; Michael T. K. Ling, Vernon Hills; Dean Laurin, Hawthorn Woods; Byron Gleason, Algonquin; Lillian A. Buan, Crystal Lake; William D. Johnston, Kildeer, all of Ill.

[73] Assignee: Baxter International Inc., Deerfield, Ill.

[21] Appl. No.: 805,218

[22] Filed: Dec. 11, 1991

[51] Int. Cl.⁶ .................................................. B32B 1/08

[52] U.S. Cl. .................. 428/35.7; 428/35.4; 428/423.1; 428/424.2; 428/424.4; 428/424.8; 428/475.2; 428/475.8; 428/483; 428/518

[58] Field of Search .......................... 428/35.2, 35.4, 428/423.1, 424.2, 424.4, 424.8, 518, 35.7, 483, 475.2, 475.8

[56] References Cited

U.S. PATENT DOCUMENTS

| | | | |
|---|---|---|---|
| 3,468,736 | 9/1969 | Porter | 156/273 |
| 4,497,857 | 2/1985 | Bonis | 428/35 |
| 4,539,793 | 9/1985 | Malek | 53/469 |
| 4,654,240 | 3/1987 | Johnston | 428/35.4 |
| 4,660,354 | 4/1987 | Lancaster et al. | 53/469 |
| 4,686,125 | 8/1987 | Johnston | 428/424.8 |
| 4,692,361 | 9/1987 | Johnston | 428/35.4 |
| 4,707,402 | 11/1987 | Thorsrud | 428/328 |
| 4,787,194 | 11/1988 | Lancaster et al. | 53/469 |
| 4,857,129 | 8/1989 | Jensen et al. | 156/273.3 |
| 4,895,457 | 1/1990 | Lancaster et al. | 383/94 |
| 4,963,419 | 10/1990 | Lustig | 428/424.8 |

FOREIGN PATENT DOCUMENTS

| | | |
|---|---|---|
| 122968 | 12/1984 | European Pat. Off. . |
| 340305 | 8/1989 | European Pat. Off. . |
| 55-150321 | 11/1980 | Japan . |
| 955285 | 4/1964 | United Kingdom . |
| 1059554 | 2/1967 | United Kingdom . |
| 2177974 | 2/1987 | United Kingdom . |
| WO82/04016 | 11/1982 | WIPO . |
| WO86/07034 | 12/1986 | WIPO . |
| WO93/09718 | 5/1993 | WIPO . |

*Primary Examiner*—Archene Turner
*Assistant Examiner*—Timothy M. Speer
*Attorney, Agent, or Firm*—Mark J. Buonaiuto; Paul C. Flattery; Amy L. H. Rockwell

[57] ABSTRACT

The coating of a RF active material on a non-RF active substrate material of typical thickness for packaging purposes, can generate sufficient thermal energy to effect strong bonding of the substrate materials. The RF active material may be deposited on less than the entire inner surface area of the substrate material, preferably, at or near the portion of the substrate surface which represents the heat seal interface. In this manner of application, additional coating or printing of other substances on the substrate surface can be achieved without hampering the heat sealing process. Flexible medical containers capable of containing a product which is maintained and removed under sterile conditions, can be constructed on commercial production machines from these coated non-RF active substrate materials.

4 Claims, 3 Drawing Sheets

METHOD AND COMPOSITIONS THAT RENDER MATERIALS RF RESPONSIVE

TECHNICAL FIELD

The present invention relates to a method of rendering a non-radio frequency (RF) active substrate responsive to RF energy for heat sealing applications.

BACKGROUND OF THE INVENTION

There are many different types of heat sources which are employed to bond various materials together. One of these sources is through the use of high-frequency electromagnetic energy which has found important commercial success in producing a desired end-product, particularly in the packaging industry. Electromagnetic energy at radio frequencies (RF) is used to efficiently heat and seal certain materials. However, it is limited to those materials which are referred to as dielectrics. A dielectric material is one in which it is possible to store electrical energy by the application of an electric field. The energy is recoverable when the field is removed. Dielectric heating is the result of the interaction of the electromagnetic energy with various components in the atomic or molecular structure of the dielectric material.

In the packaging industry, especially in medical packaging, RF energy in the range of about 27–60 megahertz (MHz) is frequently used for sealing and assembling a desired end-product. Utilizing a material's ability to convert RF energy to thermal energy that effectively heats the material interface to a suitable temperature and upon the application of pressure, very strong seals can be created in a short cycle time. RF sealing offers a variety of advantages including efficient heat generation, adequate bead formation to result in strong seals, a self limiting power input for some materials, absence of particulate matter formation during sealing process and relatively short cycle times especially for thicker sections of material.

Materials suitable for RF sealing typically exhibit high dielectric losses at the frequency of excitation and between ambient temperature and the heat seal temperature ranging as high as 310° C. However, many packaging materials exhibit little or no RF losses, thereby making them unsuitable for RF sealing applications. For example some polymers are, at a minimum, not well suited for RF heating operations as the heat sealing either does not occur, or if it occurs, it does so only after inefficiently prolonged periods of time. In commercial production lines, a quick heat seal operation is generally preferred over a prolonged heat seal operation.

Although some materials do not lend themselves to RF sealing applications, they do exhibit excellent mechanical strength, optical clarity and gloss, good elastomeric properties, and high temperature or autoclaving stability. Therefore, these materials are potentially excellent candidates for delivery and packaging, particularly for medical applications as flexible containers having a minimal thickness of 2 mils and tubing having a maximum thickness of 50 mils. Flexible containers and tubing are utilized in the medical industry for containing and delivering parenteral solutions, dialysis solutions, frozen and ambient drugs, nutrition products, respiratory therapy products, blood and plasma. Because the containers are utilized to contain fluids or solids that may be introduced into a patient's body, it is necessary for the containers to be essentially transparent, flexible, essentially free of extractables and capable of maintaining the product contained therein under sterile conditions until the product is accessed or removed from the container. Similar to the containers, the tubing used for delivery of the product from the container to the patient also needs to be flexible, essentially free of extractables and capable of delivering the product under sterile conditions. The film from which these containers and tubing are constructed must also meet these requirements.

As set forth above, because the film materials will be processed into, for example, a flexible container that houses a medical product that is introduced into a patient's body, it is necessary that the film structure does not contain chemicals that can be extracted by the medical product or are likely to pass with the medical product into the patient's body. In this regard, eliminating or minimizing the use of film materials which potentially contain such chemicals is highly favorable.

In addition to these desirable medical packaging characteristics exhibited by these weak-RF or non-RF active materials, many of these materials are known to be compatible with several drug compositions and are adaptable to known printing methods for labeling purposes. Further, the disposal of these materials may be achieved by incineration as the resulting by-products are essentially free of inorganic acids. The recycling of some of these materials is also a possible answer to disposal or waste issues.

Different methods have been previously suggested to achieve the bonding of non-RF responsive materials. For example, the use of buffer or RF responsive materials between RF generating electrodes and the materials sought to be bonded has had limited success, as discussed in U.S. Pat. No. 4,857,129. Others have addressed the problem by incorporating RF responsive materials through copolymerization with the non-RF responsive polymer materials, as disclosed in U.S. Pat. No. 4,847,155. While RF heat sealing application has been achieved under this approach, the resulting product does not offer all of the characteristics often required in medical applications. Still others have coextruded materials which rely upon thick, outer layers of RF active materials, up to 85% of the total film thickness, or high content blends of RF active materials, up to 60% of the total composition, to render heat sealability to a non-RF active material.

SUMMARY OF THE INVENTION

It has been discovered, that the deposit of a very thin layer or coating of an RF active material on a weak-RF or a non-RF active substrate material of typical thickness for packaging or delivery purposes, can generate sufficient thermal energy to effect strong bonding of the substrate materials. Either a single coating or multiple coating layers of the RF active material can be deposited on the inner substrate surfaces for sealing purposes. Specifically, it has been found that the distribution of an RF active material, ranging from 0.1 to 20% of the total film thickness, on the inner surface of a weak-RF or non-RF active substrate film is sufficient to render the substrate film RF sealable.

Further, it has been discovered that the RF active material may be deposited on less than the entire inner surface area of the substrate material. Preferably, the RF active material need only be placed at or near the portion of the substrate surface which represents the heat seal interface. In this manner of application, the coating or printing of additional substances on the substrate surface can be achieved without hampering the heat sealing process.

The RF responsive materials can be coated in thin layers on the substrate dependant upon the nature of the RF active material. For some RF responsive materials, such as solvents or plasticizers, where coating thin layers is not feasible, the deposited solvent or plasticizer has been found to render the substrate material RF active prior to full absorption of the solvent or plasticizer by the substrate. In addition, it has been discovered that the presence of a thin coating or layer of a weak-RF or non-RF active material placed over the RF coating as a nonactive sealant or cap layer does not adversely effect the ability to heat seal the packaging composition.

Flexible containers capable of containing a product which is maintained and removed under sterile conditions, can be made from these coated substrate compositions. These containers possess several characteristics required in medical applications, including excellent mechanical strength, optical clarity and gloss, good elastomeric properties, high temperature or autoclaving stability, known drug compatibility and adaptability to known printing methods for labeling purposes. Further, these materials can be constructed into commercially viable flexible containers on commercial production machines. It may also be desirable to attach a fitment on the film composition to create a flexible container with a fitment.

Other advantages of the present invention will become readily apparent as the specification proceeds to describe the invention with reference to the accompanying drawings.

DETAILED DESCRIPTION OF THE INVENTION

Figure 1:
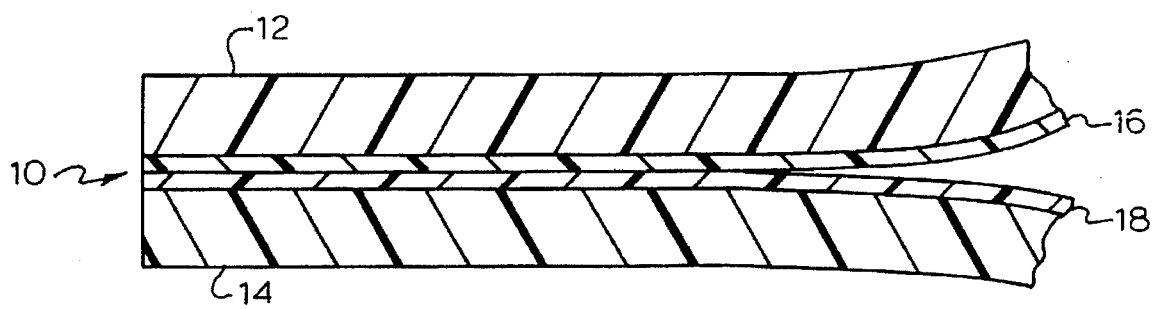
FIG. 1 is a cross section view of the heat seal interface of an embodiment of the film structure of the present invention where a single coating of a RF active material is deposited on the inner surface of both of the weak-RF or non-RF active substrate layers.

According to the present invention two layers of a non-RF active material are bonded together using radio frequency energy by coating at least partially one inner surface of one of the non-RF material or substrate layers and subjecting this composite to pressure and radio frequency energy sufficient to cause bonding of the two layers of non-RF substrates together.

For purposes of the present invention, a non-RF active substrate is generally defined as having a dielectric loss generally less than 0.05 at approximately 27–60 MHz over a temperature range of ambient to approximately 310° C. A weak-RF active substrate is generally defined as having a dielectric loss generally less than 0.2 but not less than 0.05 at approximately 27–60 MHz over a temperature range of ambient to approximately 310° C. By way of example, such non-RF and weak-RF active substrates include polyesters such as polycyclohexylenedimethylene cyclohexylenedicarboxylate-copolytetramethylene ether elastomer (PCCE) available from Eastman Chemical Co. under the tradename "ECDEL"; polyolefins including polypropylene, polyethylene, polybutenes and their copolymers; thermoplastic elastomers including block copolymers such as styrene ethylene butylene styrene copolymers (SEBS); polyethers; and, polyacetals.

For purposes of the present invention, an RF active material is generally defined as having a dielectric loss generally greater than 0.2 at approximately 27–60 MHz over a temperature range of ambient to approximately 310° C. By way of example, such RF active substrates include polymers based on vinyl chloride, vinylidene chloride, vinyl alcohol, vinyl ketones, vinylene carbonate, vinyl carbonates, vinyl esters, amides, imides, esters, carbonates, sulfones, sulfoxides, phosphates, phosphonates, polyurethanes, lactones, lactames and phenoxys; thermoplastic block copolymers containing polyamides, polyimides, polysulfones, polyesters, polycarbonates; cellulose and cellulose derivatives, such as esters, ethers, carboxylates, alcoxylates and nitrates; and, combinations and mixtures thereof.

In the following examples, an RF active material is applied to the weak-RF or non-RF active substrate by one of a variety of methods, such as roller, brush, spray, Gravure printing, extrusion coating, screen printing, hot stamping, ink-jet printing, chemical vapor deposition or electrostatic deposition. For a liquid coating process, dependant upon the nature of the RF active material, it is applied either as a solution or latex. For example, a 5% thermoplastic polyurethane solution is applied to a PCCE substrate with a brush. With some weak-RF or non-RF active substrate materials, heating the substrate layer during the application of the RF active material greatly improves the coating process.

The RF active material can be applied to one entire inner surface of the substrate layer, to the entire inner surfaces of both substrate layers, or in a designated pattern on the inner surface of one or both of the substrate layers. The patterns selected permit the RF active material to be deposited on the substrate material in the area at or near the heat seal portion of the substrate layers.

The use of such pattern coating techniques also permits the additional coating of other beneficial or therapeutic agents or components which are end-product specific. For example, certain substances have been identified as having a beneficial effect on the storage of red blood cells, as discussed in U.S. Pat. Nos. 4,326,025 and 4,507,387. By using a multiple print coating process, weak-RF or non-RF active substrate materials of the present invention may be coated not only with an RF active material but also with a red blood cell preservative. Other materials may also be print coated on the substrates of the present invention, such as drug compatible surface active compounds or agents to restrict the migration or leaching of components from a contained liquid to the container or vice versa.

Once the RF active material is deposited on the inner surface of the selected substrate material, two substrate layers are positioned next to one another with the coated, inner surface or surfaces facing one another. In this position, the facing surfaces form the inner layer of a container to be made from the two layer structure while the outer, uncoated surfaces of the substrate materials form the outer layers of the container.

By way of example, FIG. 1 is a cross section view of an embodiment of the film structure 10 of the present invention having upper and lower substrate layers 12, 14 of PCCE and coating layers 16, 18 of plasticized PVC. In this specific embodiment, a pattern coating application is utilized to deposit 0.1 mil thick coating layers 16, 18 of PVC on both PCCE substrate layers 12, 14.

Figure 2:
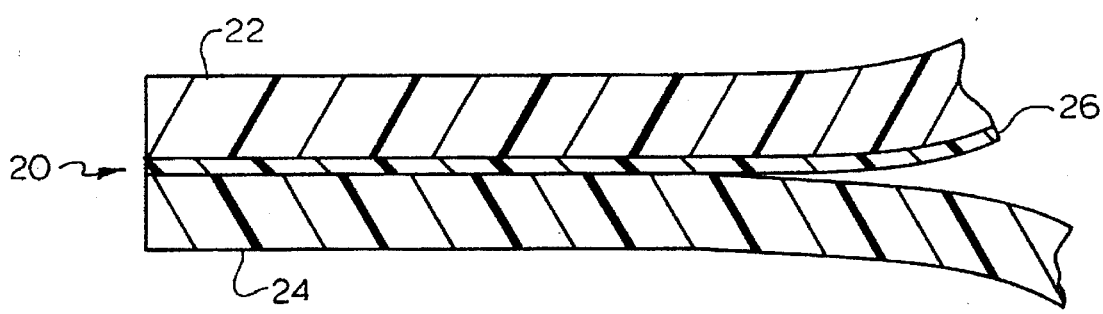
FIG. 2 is a cross section view of an embodiment of the film structure of the present invention where a single coating of a RF active material is deposited on the inner surface of one of the weak-RF or non-RF active substrate layers.

FIG. 2 is a cross section view of a second embodiment of the film structure 20 having upper and lower substrate layers 22, 24 and a single coating layer 26. As in film structure 10, coating layer 26 may be deposited on the inner surface of substrate layer 22 through a pattern coating application. Alternatively, coating layer 26 may be deposited over the entire inner surface of substrate layer 22 by a roller or brush, for example.

Figure 3:
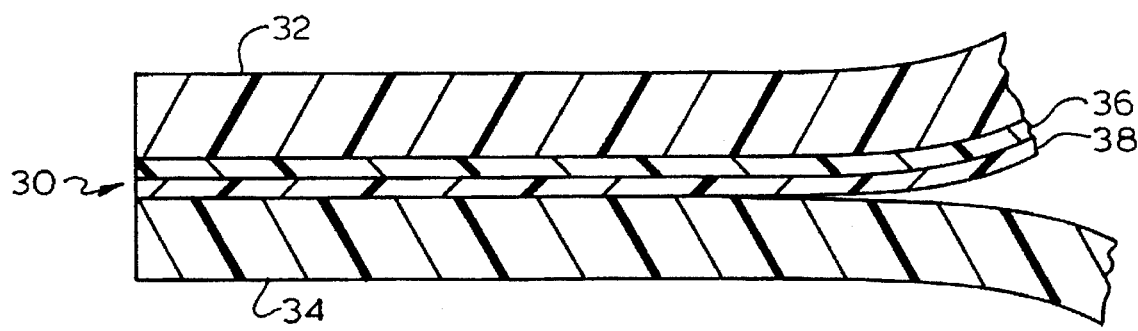
FIG. 3 is a cross section view of an embodiment of the film structure of the present invention where multiple coatings of a RF active material is deposited on the inner surface of one of the weak-RF or non-RF active substrate layers.

FIG. 3 is yet another embodiment of the film structure 30 of the present invention, shown in cross section view. In this specific embodiment, two coating layers 36, 38 are deposited on the inner surface of the upper substrate layer 32. Coating layers 36, 38 may be the same or different in composition or RF responsiveness.

Figure 4:
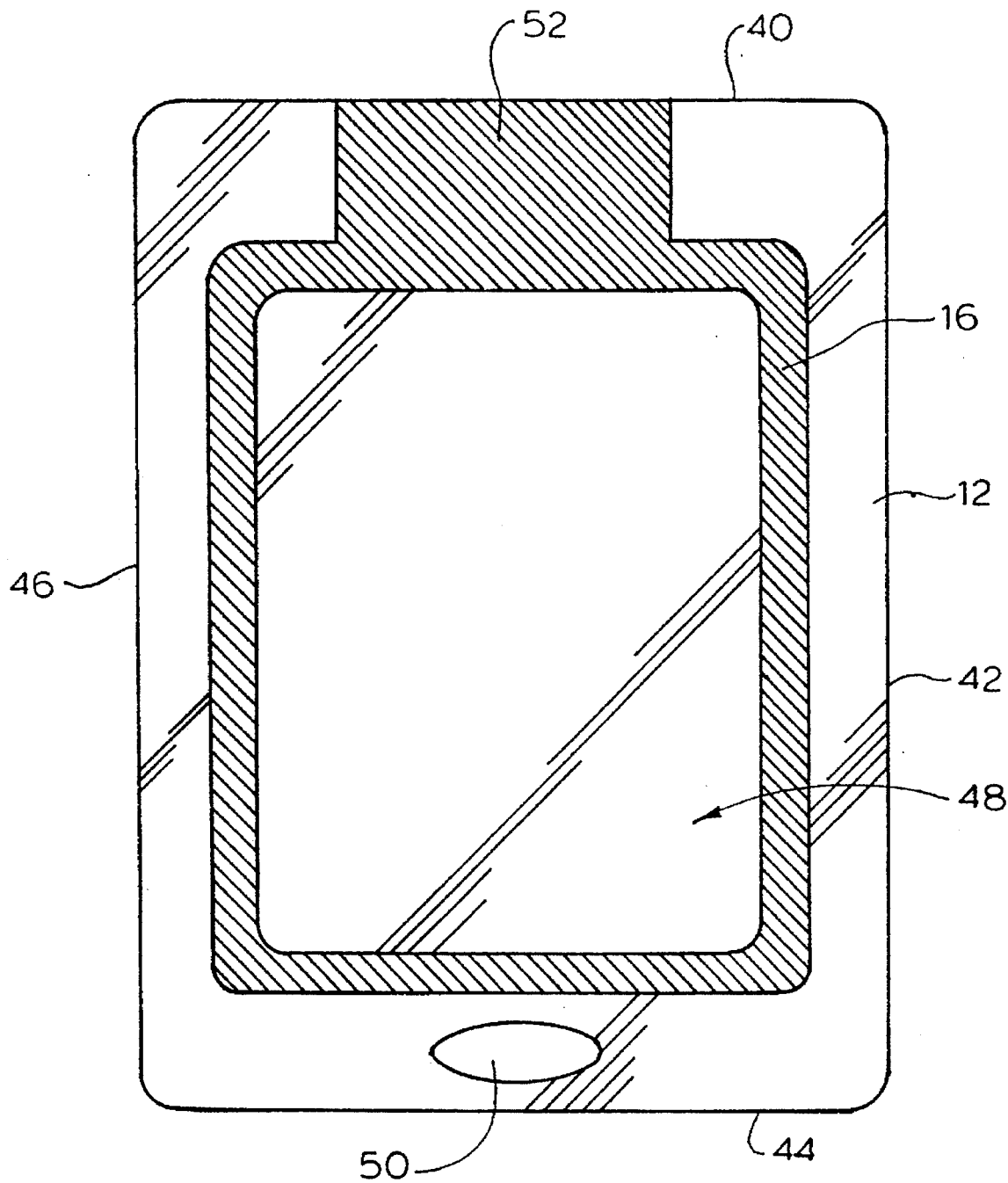
FIG. 4 is a top plan view of the inner surface of a single substrate layer with a RF active coating, similar to the film structure shown in FIG. 1, as used to construct a flexible medical container; and, FIG. 5 is a cross section view of the film material of the present invention as positioned in a commercially available RF heat generating machine.

FIG. 4 demonstrates the pattern coating application of coating layer 16 as deposited or printed on the substrate layer 12. In this specific example, film structure 10 is utilized to construct a flexible pouch container typical in medical applications. The container can be constructed with substrate layers 12, 14 being bonded or sealed on four sides 40, 42, 44 and 46, to create an interior region 48 for housing products such as blood or parenteral solutions. Typically, the container is provided with a hanging mechanism, so that the container can be suspended, for example, from a pole, and as such can include a hanger hole 50. The container can be adapted to include a port (not shown) used for accessing the contents. Such a port is provided by sealing a port tubing of known construction in the port sealing region 52 of container. It should be noted that if the container is produced on a form, fill, seal packaging machine, the container would only be sealed on three sides.

The container can be created on a standard packaging machine by feeding the film structure 10 into the machine. Prior to feeding film structure 10 into the machine, coating layers 16, 18 are deposited on substrate layers 12, 14 in a pattern specific to the design of the container sides and port sealing region 52. In this regard, one of the advantages of the present invention is that the minimal amount of RF active material is used to create the required seal strength for the container. In addition, minimal, if any, of the RF active material will come into direct contact with the product contained in interior region 48 of the container.

A further advantage of the present invention is evident when pattern coating application of the coating layer or layers is utilized. By depositing the RF active coating layer in a given specific area, the uncoated portion of the inner surface of the substrate layer is available to receive coatings of beneficial or therapeutic treatments of other materials or compositions. For example, it is known that citrate esters can suppress the hemolysis of red blood cells. By using a multiple print coating process to construct a blood bag similar in design to the container in FIG. 4, substrate layer 12 may be coated not only with RF active coating layer 16 but also with a citrate ester in interior region 48.

Similar to the film structure illustrated in FIG. 3, a coating layer 36 may be deposited on the inner surface of the upper substrate layer 32. Rather than apply additional coatings, a cap layer can be applied, in place of layer 38 and to sheathe coating layer 36. This cap layer is of sufficient thickness and coverage to sheathe coating layer 36 without adversely effecting the RF heat sealing process. Further, the cap layer is of a material which is generally unreactive when it comes into contact with medical products or components such as parenteral solutions, nutritional fluids or blood products. Preferably, the cap layer is selected from the group of materials described herein as possible substrate materials. Therefore, when constructing a flexible container of the type generally described and illustrated in FIG. 4, the cap layer acts as a barrier between the RF active coating layer 36 and the product contained within the container. By limiting the direct contact of the RF active material with the contained product, the occurrence of leaching and/or extracting can be minimized or virtually eliminated.

Figure 5:
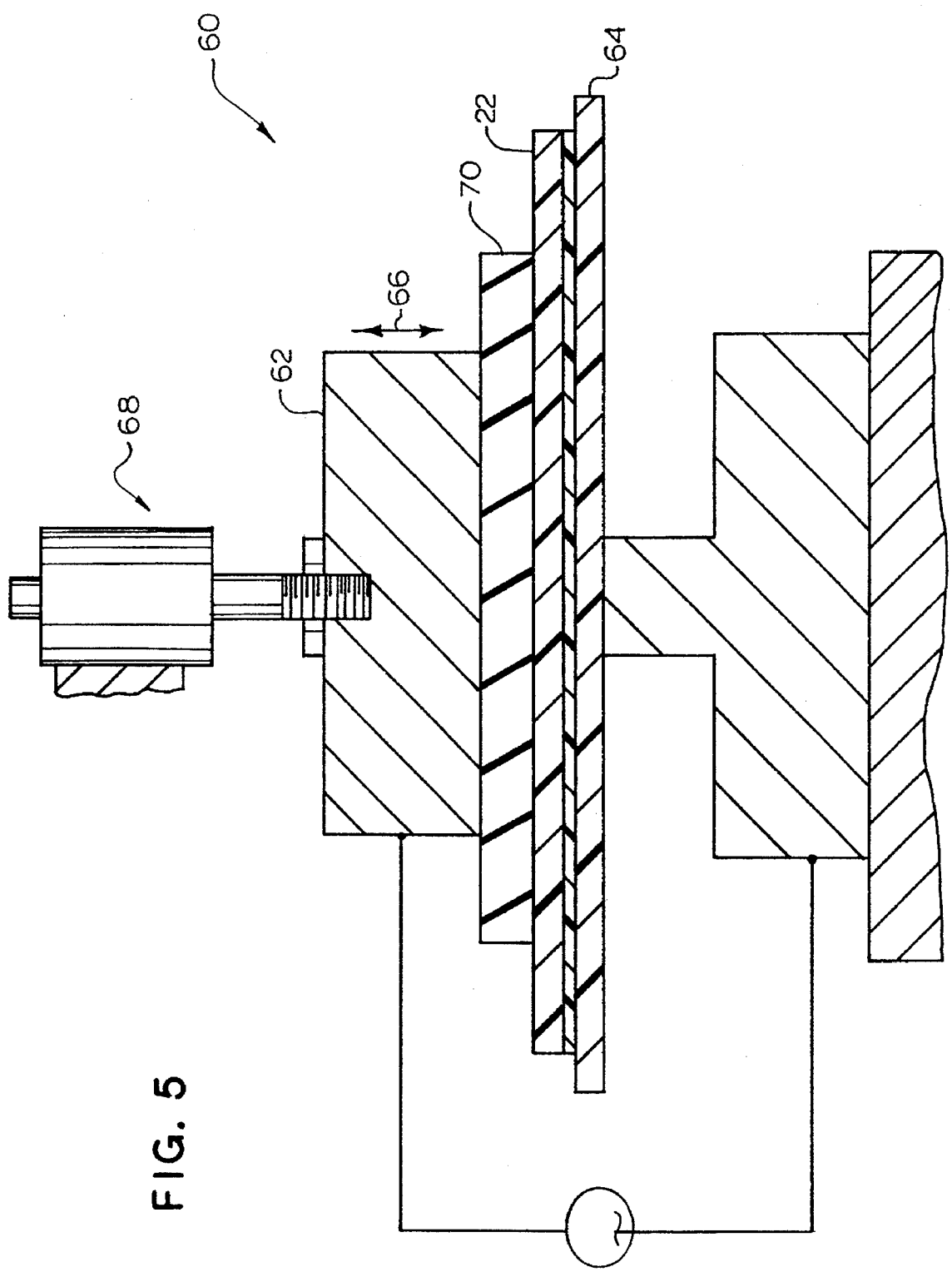

As shown in FIG. 5, a Callanan RF generating machine 60, having an input of approximately 2 kilowatts, is utilized. The RF generating machine 60 has a dielectric film sealer having narrow, elongated brass dies or electrodes 62, 64 with upper die 62 being grounded. The Callanan machine 60 operates with a frequency of approximately 27 MHz. The upper die 62 can be pneumatically, mechanically or hydraulically raised or lowered, as indicated by arrow 66 by an actuation means 68. Positioned immediately below the upper die 62 is a buffer material or pad 70, which prevents arcing between dies 62, 64 and sticking between the die 62 and the coated substrate 22. The film structure of the present invention, for example, film 20, is positioned between lower die 64 and buffer pad 70. The upper brass sealing electrode 62 is brought downward to press against buffer pad 70 and film structure 20 until contact is made between upper substrate layer 22, buffer pad 70 and upper die 62. The appropriate pressure is added and RF energy is introduced so that sufficient thermal energy is generated to timely heat film structure 20 and effect a strong heat seal of substrate layers 22, 24. Once sealed, dies 62, 64 are released by raising die 62. The film structure 20 is permitted to cool with a typical cooling period being a second.

The heat seals created are then examined with the required strong seal considered to have been made when the two substrate layers 22, 24 cannot be physically separated at the heat seal interface without tearing either substrate layer 22, 24.

The invention will be further appreciated in light of the following detailed examples as shown in Table 1. Relying upon substrate layers of PCCE with layer thicknesses ranging from 5 to 7 mils, various coating materials are prepared and applied in a 5% cyclohexanone solution. The coating materials are deposited on one inner surface of one of the substrate layers. The thickness of the coating materials also varied from equal to or less than 0.8 mils. (Unmeasurable coating thicknesses are indicated by a "–" mark in Table 1). To aid in the bonding of the coating material to the substrate layer, a bonding agent may be blended with the coating material. Generally, the bonding agent is a material similar in composition to the substrate layer. For example, refer to Film Structure No. 5 in Table 1.

Using a RF machine similar to Callanan machine 60 and standard processing parameters for the generation of RF heat seals, the film structures are sealed to produce the flexible pouch container similar in design to the container shown in FIG. 4.

Through visual observation and physical testing, all of the seals produced from the film structures identified in Table 1 were found to be strong. These results are achievable despite material variations of the specific coating layers and the supplier of such materials (for example, three different polyurethane compositions were tested).

TABLE 1

| Film Structure | "PCCE" Substrate Layer thickness (mil) | Coating Layer (% by weight) | Coating Layer Thickness (mil) | Voltage (RMS) | Heat Seal Time (Sec) | Observations: Seal Strength |
|---|---|---|---|---|---|---|
| 1 | 7 | PVC Composition No. 1[1] | 0.1 | 1146–1238 | 3 | strong |
| 2 | 7 | 50% PVC Composition No. 1/50% PVC | 0.16 | 1146–1238 | 3 | strong |
| 3 | 5–7 | 50% Polyester-ether Copolymer No. 1[2]/40% PVC/ 10% Polymeric Plasticizer | — | 1238–1337 | 3 | strong |
| 4 | 5–7 | 50% Polyester-ether Copolymer No. 2[3]/40% PVC/ 10% Polymeric Plasticizer | — | 1238–1337 | 3 | strong |
| 5 | 7 | 40% PCCE/50% PVC/10% Polymeric Plasticizer | 0.25 | 1238–1337 | 3 | strong |
| 6 | 7 | 70% PVC/20% EVA Blend No. 1/10% Polymeric Plasticizer | — | 1146–1238 | 3 | strong |
| 7 | 5 | Polyurethane No. 1[4] | 0.105 | 1238–1337 | 3 | strong |
| 8 | 5 | 90% Polyurethane No. 1/10% Cyclohexane | 0.78 | 1238–1337 | 3 | strong |
| 9 | 5 | 50% Polyester-ether Copolymer No. 1 50% Polyurethane No. 1 | — | 1337 | 4 | strong |
| 10 | 5 | 70% PCCE/30% Polyurethane No. 1 | 0.2 | 1337 | 4 | strong |
| 11 | 5 | 70% PCCE/30% Polyurethane No. 2[5] | — | 1337 | 4 | strong |
| 12 | 5 | Polyurethane No. 3[6] | — | 1238–1337 | 3 | strong |
| 13 | 5 | 70% PCCE/30% PVMK[7] | 0.263 | 1337 | 4 | strong |

[1] "PVC Composition No. 1" is a blend of a polyvinyl chloride copolymer with a vinyl acetate copolymer and a polymeric plasticizer
[2] "Polyester-ether Copolymer No. 1" is a copolymer available from DuPont under the tried "Hytrel 4056"
[3] "Polyester-ether Copolymer No. 2" is a copolymer available from DuPont under the tried "Hytrel 5556"
[4] "Polyurethane No. 1" is a product available from Mobay under the tried "Texin 985 Am"
[5] "Polyurethane No. 2" is a product available from Dow under the designation "XU 63127"
[6] "Polyurethane No. 3" is a product available from Morton International under the tried "Morthane 103"
[7] "PVMK" is polyvinyl methyl ketone Similar to the procedures and observations represented by the example materials in Table 1, film structures having substrate layers of polyolefins have also been examined. Relying upon substrate layers with thicknesses approximately 8 mils, various coating materials are prepared and applied. The coating materials are deposited on one inner surface of one of the substrate layers. The thickness of the coating materials varied from approximately 0.3 to 0.8 mils. Using similar processing and testing as the examples from Table 1, samples are produced from the coated-polyolefin film structures.

Detailed in Table 2, strong seals were achieved with substrates in the olefin family; that is, polyethylene, polypropylene and polybutenes and their copolymers. The strong seals were achieved despite the non-polar nature of the olefin structures which have dielectric loss, at 27 MHz, much less than 0.01, over the temperature range of ambient to at least 200° C. Further, since most of the polyolefins are semicrystalline, they are not readily soluble in conventional solvents at ambient temperatures. Therefore, finding a coating composition that will adhere to the substrate film is difficult. However, mixtures of a commercially available polypropylene dispersion with RF active materials could be applied as very thin coatings to the substrate layer. Such a dispersion acts as a bonding agent, aiding in the bonding of the coating material and substrate layer to which the coating is applied. After drying off the coating solvents, an elevated temperature treatment is applied to the substrate to "fuse" the coating material to the substrate layer. In this way, very thin, yet integrally bonded coatings to the substrate layer were created.

TABLE 2

| Film Structure | "Alloy" Substrate Layer Thickness (mil)[1] | Coating Layer (% by weight) | Coating Layer Thickness (mil) | Voltage (RMS) | Heat Seal Time (Sec) | Observations: Seal Strength |
|---|---|---|---|---|---|---|
| 1 | 8 | 50% PP Dispersion[2]/25% Polyurethane[3]/25% modified-SEBS[4] | 0.3 | 1337 | 5 | strong |
| 2 | 8 | 60% PP Dispersion/10% Erucamide/30% modified-SEBS | 0.5 | 1238 | 8 | strong |
| 3 | 8 | 60% PP Dispersion/10% Erucamide/30% modified-SEBS | 0.8 | 1238 | 8 | strong |
| 4 | 8 | 50% PP Dispersion/25% Polyvinyl Chloride/25% modified-SEBS | 0.8 | 1238 | 5 | strong |
| 5 | 8 | 50% PP Dispersion/25% PEG-600 dibenzoate/25% modified-SEBS | 0.8 | 1238 | 6 | strong |
| 6 | 8 | 40% PP Dispersion/30% modified-SEBS/30% PVMK[5] | 0.3 | 1238 | 6 | strong |
| 7 | 8 | 40% PP Dispersion/30% modified-SEBS/30% Polyacryloxy-ethoxy 4-hydroxy benzophenone | 0.6 | 1238 | 8 | moderate |
| 8 | 8 | 40% PP Dispersion/30% modified-SEBS/30% Polyamide resin | 0.4 | 1238 | 5 | strong |

[1]An "alloy" of 40% polypropylene/30% polyethylene/30% polybutene-1 (% by weight)
[2]"PP Dispersion" is polypropylene particles dispersed in hydrocarbon solvent and is available from Morton Chemical under tradename "Morprime 10B"
[3]"Polyurethane" is a product available from Morton Chemical under the tradename "Morton 192"
[4]"modified-SEBS" is a modified styrene ethylene butylene styrene copolymer available from Shell Chemical under the trademark "Kraton"
[5]"PVMK" is polyvinyl methyl ketone By way of the example illustrated in FIG. 2, an approximately 8 mil thick substrate layer of polypropylene ethylene random copolymer is coated and sealed to a second substrate layer of a different composition. Refer to Table 3. Despite different substrate layers, strong heat seals resulted.

TABLE 3

| Coated Substrate Thickness (mil)[1] | Coating Layer | Coating Layer Thickness (mil) | "Noncoated" Substrate Layer | Voltage (RMS) | Heat Seal Time (Sec) | Observations: Seal Strength |
|---|---|---|---|---|---|---|
| 8 | 50% PP Dispersion[2]/ 50% EVA[3] | 1.0 | Polyethylene butene-1 copolymer | 1337 | 4.5 | strong |

[1]Layer is a polypropylene ethylene random copolymer having a melting point of 150° C. and melt flow index of 2.0
[2]"PP Dispersion" is polypropylene particles dispersed in hydrocarbon solvent and is available from Morton Chemical under tradename "Morprime 10B"
[3]"EVA" is ethylene vinyl acetate copolymer available from Quantum Chemical under the tradename "Vynathene-EY90400"

While specific embodiments have been illustrated and described, numerous modifications come to mind without significantly departing from the spirit of the invention, and the scope protection is only limited by the scope of the accompanying claims. For example, the present invention can be varied to provide bonding between dissimilar but compatible substrate materials.

What we claim is:

1. A material structure comprising:

a first substrate layer with inner and outer surfaces and a dielectric loss approximately less than 0.2 at approximately 27–60 MHz over a temperature range of ambient to approximately 310° C.;

a second substrate layer with inner and outer surfaces and a dielectric loss approximately less than 0.2 at approximately 27–60 MHz over a temperature range of ambient to approximately 310° C., the second substrate layer inner surface being positioned adjacent to the first substrate layer inner surface to define an interface;

a first deposit within a portion of the interface defining an RF sealable area, the first deposit has a dielectric loss approximately greater than 0.2 at approximately 27–60 MHz over a temperature range of ambient to approximately 310° C., the first deposit being a polymer generated from or containing a member selected from the group consisting of vinyl ketone, vinylene carbonate, vinyl carbonate, imide, carbonate, sulfone, sulfoxide, phosphate, phosphonate, urethane, lactone, lactam, phenoxy, thermoplastic block copolymer and combinations thereof; and, a seal within said RF sealable area created by means for applying electromagnetic radiation having a frequency within a range of 27–60 MHz to the RF sealable area attaching the first substrate layer to the second substrate layer along the first deposit.

2. A material structure comprising:

a first substrate layer with inner and outer surfaces and a dielectric loss approximately less than 0.2 at approximately 27–60 MHz over a temperature range of ambient to approximately 310° C.;

a second substrate layer with inner and outer surfaces and a dielectric loss approximately less than 0.2 at approximately 27–60 MHz over a temperature range of ambient to approximately 310° C., the second substrate layer inner surface being positioned adjacent to the first substrate layer inner surface to define an interface, the first and second substrate layers each being selected from the group consisting of polyesters, thermoplastic block copolymers, polyethers, and polyacetals;

a first deposit within a portion of the interface defining an RF sealable area, the first deposit has a dielectric loss approximately greater than 0.2 at approximately 27–60 MHz over a temperature range of ambient to approximately 310° C., the first deposit being a polymer generated from or containing a member selected from the group consisting of vinyl ketone, vinylene carbonate, vinyl carbonate, imide, carbonate, imide sulfone, sulfoxide, phosphate, phosphonate, urethane, lactone, lactam, phenoxy, thermoplastic block copolymer and combinations thereof; and, a seal within said RF sealable area created by means for applying electromagnetic radiation having a frequency within a range of 27–60 MHz to the RF sealable area attaching the first substrate layer to the second substrate layer along the first deposit.

3. The material structure of claims 1 or 2 wherein the first deposit has a thickness in the range of 0.1% to 20% of the material structure.

4. The material structure of claims 1 or 2 wherein the thermoplastic block copolymer includes a segment selected from the group consisting of amide, imide, sulfone, ester, carbonate, cellulose, ether, carboxylate, alcoxylate and nitrate.

\* \* \* \* \*